Sept. 20, 1955  W. J. HUGHES  2,718,496
LIQUID TREATING APPARATUS
Filed Sept. 18, 1951  2 Sheets-Sheet 1

INVENTOR.
Walter J. Hughes
BY
Agent

Sept. 20, 1955   W. J. HUGHES   2,718,496
LIQUID TREATING APPARATUS
Filed Sept. 18, 1951   2 Sheets-Sheet 2
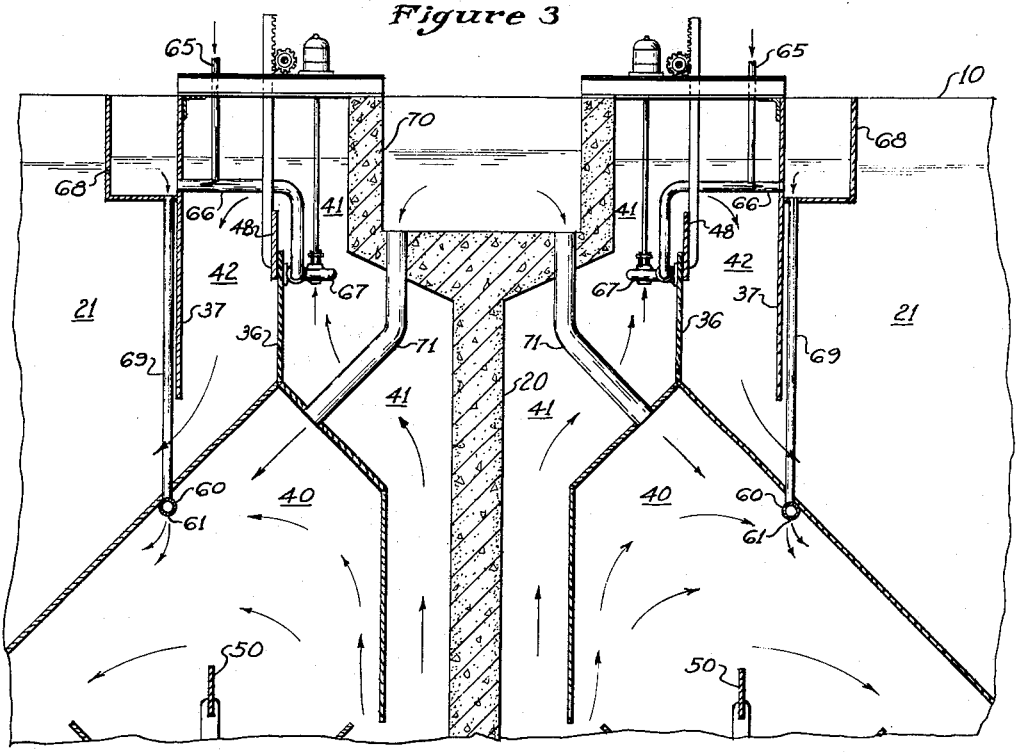
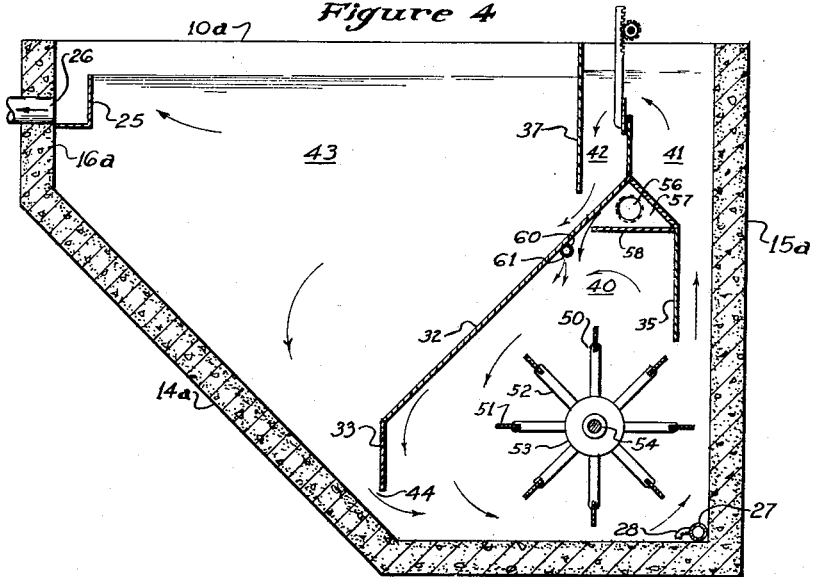
INVENTOR.
Walter J. Hughes
BY
Agent 2,718,496
Patented Sept. 20, 1955

2,718,496

LIQUID TREATING APPARATUS

Walter J. Hughes, Tucson, Ariz., assignor to Infilco Incorporated, Tucson, Ariz., a corporation of Delaware Application September 18, 1951, Serial No. 247,069

10 Claims. (Cl. 210—16)

This invention relates to an apparatus for slurry type liquid treatment. More particularly the invention relates to an apparatus wherein the principles of slurry type liquid treatment are adapted to a rectangular basin or tank.

In slurry type liquid treating apparatus the incoming liquid and reagent are usually mixed and reacted with one another in a mixing and reaction zone in and with a slurry composed of solids accumulated from previously treated water and suspended in liquid undergoing treatment. In addition to a continuous circulation within the mixing and reaction zone, a portion of the slurry is continuously circulated out of the mixing and reaction zone, through a secondary reaction zone and a separation zone, and back into the mixing and reaction zone.

Clarification in such slurry type liquid treatment occurs either by upward filtration of liquid through a relatively quiescent suspension or blanket of slurry, or by dynamic separation from a flowing stream of slurry. The rate of such dynamic separation of clarified liquid from a flowing stream of slurry is substantially higher than can be obtained by upward filtration through a slurry filter where the rate of rise is limited to that at which the lightest solid particles are no longer carried along by the rising liquid. The apparatus of this invention belongs to the type providing dynamic separation of clarified liquid from moving streams of slurry.

One of the important requisites of a slurry type liquid treatment is uniformity of mixing and circulation. Heretofore uniformity has been provided by use of a round or square basin with a rotor effecting circulation within a mixing and reaction zone under a centrally located hood, as well as a circulation leading out of the mixing and reaction zone through passageways arranged concentrically with the tank and discharging radially outward over the outside of the hood and returning to the mixing and reaction zone radially inward. Rectangular tanks have not been used extensively for such slurry type treatment due to the difficulties of providing uniformity of mixing and circulation in an elongated area.

It is a principal object of this invention to provide means for effecting uniform mixing and circulation in elongated tanks of any desired length.

Another object is to provide an apparatus whose dimensions can be standardized with regard to its vertical section, adaptation to different throughput capacities being provided solely by horizontal elongation of the standardized design.

A further object is to provide a double-sided apparatus of this general type which lends itself readily to operation of the two sides in parallel or in sequence, or to entirely independent use of the two sides.

Other objects of the invention will become apparent upon consideration of the description and claims which follow.

In the drawings:

Figure 3 is an enlarged sectional view along line 3—3 of Figure 2; and

Figure 4 is a cross-sectional view of a one-sided apparatus according to the invention.

Figure 1:
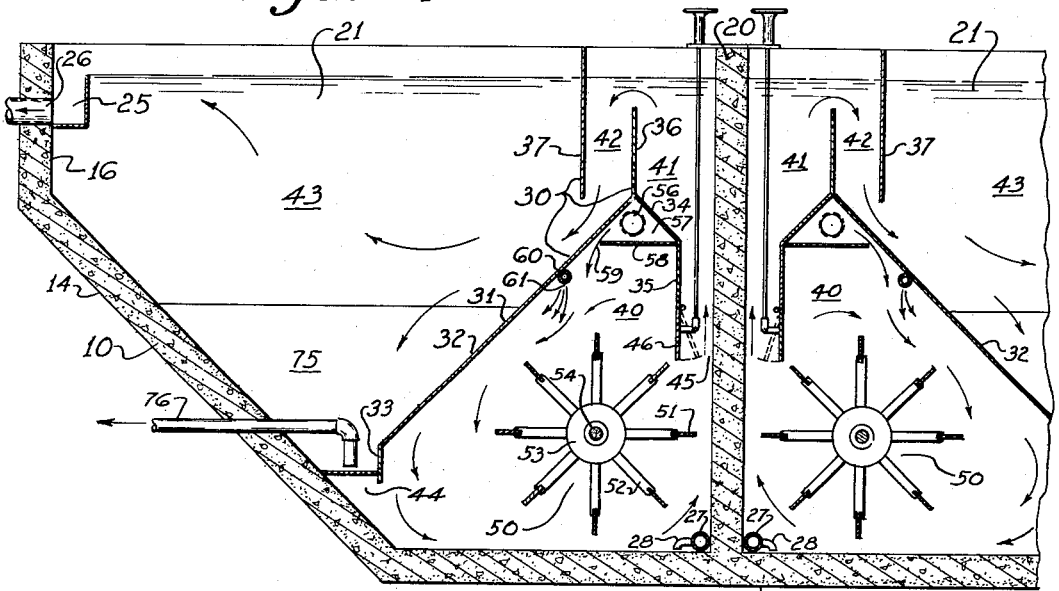
Figure 1 is a partial vertical cross-sectional view of a double-sided apparatus according to the invention.
Figure 2:
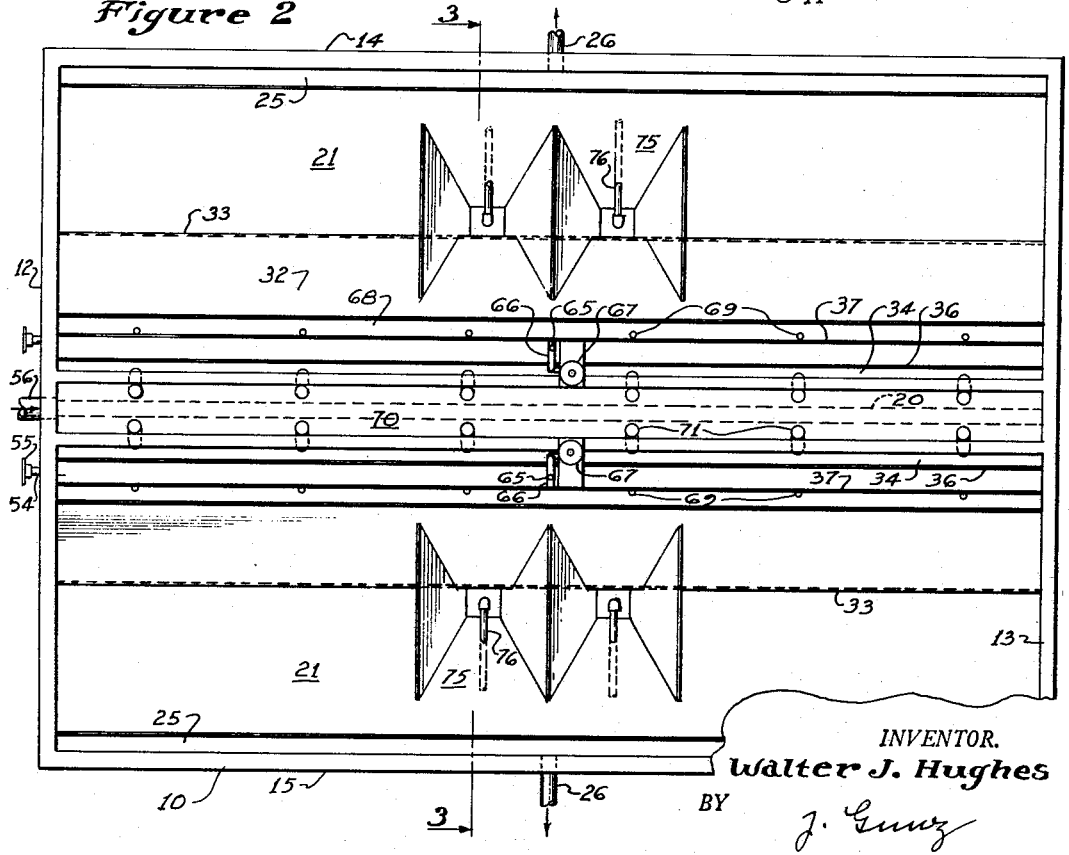
Figure 2 is a plan view of a modification of the apparatus of Figure 1.

The tank 10 of Figures 1, 2 and 3 is of generally rectangular section in plan and has a rectangular bottom 11, vertically extending end walls 12 and 13, and upwardly and outwardly sloping side walls 14 and 15. The upper part 16 of the side walls 14 and 15 may be vertical, as shown. A vertical wall 20 divides the tank 10 into two equal parts or chambers 21—21. Since the two chambers 21 are identical, only one will be described in detail.

Each chamber 21 is provided with a launder 25, whose overflow edge establishes the normal liquid level in the basin. Clarified liquid is withdrawn from the launder 25 through an effluent conduit 26. A drain pipe 27 runs along the lower part of wall 20 and is provided with pick-up openings such as 28 spaced along its length. A partition structure 30 extends the full length of the chamber 21 from end wall 12 to end wall 13. The partition structure 30 includes a hood 31, formed by a plate 32 sloping upwardly in opposite direction to the wall 14 toward the longitudinal axis of the tank and provided with a short vertical skirt 33; and a shorter plate 34 sloping from the upper end of plate 32 in the opposite direction, and also provided with a vertical skirt 35, as shown; a plate member 36 extending upwardly from the apex of the hood 31 to an elevation below the normal liquid level in the chamber 21, and a second vertical plate member 37 horizontally spaced from the first plate member 36 and extending downwardly from the top of the tank to an elevation spaced above the sloping plate 32.

The partition structure 30 forms in the chamber 21 a mixing and reaction compartment 40 under the hood 31, a secondary reaction compartment including an upflow passageway or section 41 between the wall 20 and the plates 34 and 36, and a downflow passageway or section 42 between the plates 36 and 37, and an outer separating compartment 43 of upwardly increasing cross-sectional area between the inclined tank wall 14 or 15, respectively, and the oppositely inclined plate 32. The skirt 33 forms with the tank wall 14 or 15, respectively, a relatively narrow inlet passageway or conduit 44 leading from the outer compartment 43 to the mixing and reaction compartment 40, and the skirt 35 forms with the vertical wall 20 a relatively narrow outlet passageway 45 leading from the mixing and reaction compartment 40 under the hood to the upflow passageway 41. To regulate the quantity of flow through the outlet passageway 45 and passageways 41 and 42, the width of the outlet passageway 45 can be adjusted by positioning of a valve plate 46 which is pivotally mounted on the skirt 35. Any suitable means for positioning the valve plate 46 may be provided, such as the bell crank and positioning rod shown.

Another means for regulating the quantity of flow through passageways 41 and 42 is shown in Figure 3. A weir 48 is slidably connected to the plate member 36 and can be positioned vertically by any suitable means, such as the rack and pinion shown, to vary the elevation of the submerged overflow from the upflow passageway 41 to the downflow passageway 42.

A paddle reel 50 is mounted in axially offset position in the mixing and reaction compartment 40. The radial blades 51 of reel 50 extend substantially for the full length of the compartment 40 and are supported at spaced points by sets of radial arms 52, each set being mounted on a hub 53 keyed to a horizontally extending rotatable shaft 54. Obviously, the blades 51 can be made in sections. The driven end of shaft 54 may extend through one of the end walls, as shown in Figure 2, or may be inside the compartment 40. Suitable drive means are connected to the shaft 54, such as the sprocket 55, which may be driven by a suitable motor, not shown.

Liquid to be treated and chemicals can be introduced in diverse manner. Coagulants will usually be mixed with the liquid before it enters the compartment 40. Precipitating or softening reagents, such as lime, however, should be mixed with the liquid in the presence of slurry. In the embodiment of Figure 1 the liquid and chemical reagent are both mixed with slurry in the mixing and reagent compartment 40. In this embodiment the inlet pipe 56 for the liquid to be treated discharges into a distribution trough or inlet duct 57 formed across the apex of the hood 31 by a floor 58. The floor 58 is spaced from the plate 32 to leave a narrow slot 59 through which the water enters the compartment 40 and is uniformly distributed over its entire length. 60 is a chemical inlet header provided with slotted discharge areas such as 61. Both the raw water inlet duct 57 and the chemical header 60 discharge in the direction of the flow created by rotation of the reel 50.

In the embodiment of Figures 2 and 3 the chemical reagent is mixed with slurry prior to its entering the mixing and reaction compartment to prevent clogging of the chemical inlet header 60. The reagent is introduced through a chemical pipe 65 into a conduit 66 leading from the discharge side of a slurry pump 67, which has its intake in the upflow passageway 41. Thus, chemical and slurry are well mixed with one another as they flow together through the conduit 66 to a trough 68. From the trough 68 the mixture of slurry and reagent is discharged uniformly through a suitable number of spaced downtake pipes 69 into the chemical header 60, from which it is distributed along the mixing and reaction compartment.

When the two chambers 21 are operated in parallel, a raw liquid inlet trough common to both may be used instead of the separate inlet troughs 57 of Figure 1. Such a trough is shown at 70 in Figure 3 and may be integral with the dividing wall 20. Conduits 71 lead from spaced points on both sides of the bottom of the trough 70 and discharge to the two mixing and reaction compartments 21—21 in the direction of circulation of the slurry therein. This manner of introducing the liquid to be treated provides uniform distribution in a tank of any length. When the same chemical reagent is used in both chambers 21, the construction shown in Figures 2 and 3 can be considerably simplified by omitting the troughs 68 and using only one slurry pump 67, one chemical inlet line 65, and one conduit 66 discharging into the inlet end portion of the trough 70, where reagent and slurry are mixed with the incoming liquid.

One or more open top solids concentrators 75 of conventional construction are located in the lower portion of the outer chamber, their number and size being determined by the quality and quantity of solids to be thickened therein. Sludge is discharged from each concentrator through a sludge outlet conduit 76.

The operation of the apparatus will be readily understood. The reel 50 is rotated in the direction indicated by the arrows; i. e. upwardly adjacent the wall 20 and downwardly adjacent the inclined wall 32. Assuming that the apparatus has been in operation for a time sufficient to accumulate a slurry filling the chamber 21 to the predetermined elevation of the upper slurry surface, rotation of the reel 50 causes a parallel, equalized rotation of slurry over the entire length of the compartment 40, the flow pattern being the same in each vertical plane and conforming substantially to the shape of the compartment. Liquid to be treated entering through duct 57 or conduits 71, and chemicals entering through duct 60 are immediately picked up by, and thoroughly mixed with, a large quantity of rotating slurry, and the reactions between the liquid and the reagent take place in and with the slurry. As the slurry moves upwardly along the wall 20, a portion of slurry in excess of the quantity of throughput is impelled by impulses from the rotating reel 50 through the outlet conduit 45 and the upflow passageway 41 and the downflow passageway 42. The velocity of this flow can be controlled by positioning of the valve plate 46 or weir 48. The compartment 40 and the passageways 41 and 42 are so dimensioned that the reactions are substantially completed therein. A portion of the slurry leaving the downflow passageway 42 flows laterally across the compartment 43, and an output portion of clarified liquid separates from this flowing slurry and rises to the launder 25 and so to the effluent conduit 26. Another portion of the slurry continues downwardly and re-enters the mixing and reaction compartment 40 through the inlet passageway 44 in the direction of rotation of the slurry passing the inlet 44, so that this return slurry is immediately mixed with the slurry circulating in the compartment 40.

The slurry surface is maintained at the desired elevation by regulating the withdrawal of solids from the concentrator 75. Any grit in the liquid to be treated will be swept across the floor 11 by the circulating slurry, but will be too heavy to be entrained in the slurry rising along the wall 20 and will, therefore, deposit. Such deposited material can be blown off through the drain 27.

When the chambers 21—21 are operated in series, or independently of each other, the wall 20 must extend to an elevation above the normal liquid level as established by the overflow edges of the launders 25, but when the chambers 21—21 are operated in parallel, the wall 20 need not extend to the top of the tank, as shown, but may terminate at about the lower end of plate 34. However, extending the wall 20 to the top of the tank has the advantage that the two chambers 21 can be drained independently of each other, each being provided with a drain.

The one-sided apparatus shown in Figure 4 is substantially the same as one-half of the apparatus of Figures 1 to 3. One side wall 14a of the tank 10a of this embodiment is inclined upwardly and outwardly from the flat bottom 11a, and its upper portion 16a may be vertical. The other side wall 15a is vertical throughout. The reel 50 in this embodiment is axially offset to adjacent the side wall 15a. Obviously, the slurry pump 67, chemical line 65, conduit 66, and chemical trough 68, shown in Figure 3, can also be used in the embodiment of Figure 4 instead of the inlet means shown in the figure, and adjustable weir 48 can be replaced by the valve plate 46 of Figure 1.

It will be seen that with an apparatus of any desired length my invention provides uniform mixing of liquid, reagent and slurry, and an equalized rotational flow pattern throughout the length of the mixing and reaction compartment, as well as uniform circulation from all parts of the elongated mixing and reaction chamber through the secondary reaction compartment and the separating compartment, back to the mixing and reaction compartment. The apparatus can be designed with a standard vertical section, and any desired throughput capacity can be obtained by increasing the length of the apparatus without changing the relations of height and width of the various parts.

For relatively small throughput capacities the single sided form of Figure 4 is advantageous. The double sided apparatus can be used equally well for parallel, sequential, or entirely independent treatment in the two chambers 21, and is more economical than two separate apparatuses affording the same throughput capacity. In parallel treatment half of the liquid to be treated is treated in each chamber 21 in the same manner. In sequential treatment the liquid to be treated flows in sequence through the two chambers 21 and can be treated therein with the same or with different reagents. For example, coagulants can be used as treating reagent in one chamber 21, and the liquid can thereafter be treated with softening reagents in the other chamber 21; or split treatment can be carried out by treating only a portion of the liquid, for example, with coagulant in one chamber 21 and another portion, for example, with softening reagents in the other chamber 21 and mixing the clarified effluents of both chambers. Where the treated water is used for purposes needing a different degree, and often also kind, of treatment, such as boiler makeup and process water, or where the water to be treated comes from different sources necessitating different degree and kind of treatment, such as different waste waters of the same plant, or a hard but clear well water and a turbid less hard surface water, independent treatment can be given to the two waters in the two chambers 21.

I claim:

1. In a liquid treating apparatus of the type specified a chamber of generally rectangular section in plan, partition means dividing said chamber into a mixing and reaction compartment, a secondary mixing and reaction compartment, and a separation compartment connected for flow therethrough in the sequence cited, each of said compartments extending for the full length of said chamber, said mixing and reaction compartment having a floor and a vertical wall extending therefrom, said partition means including a vertically extending portion forming with said vertical wall an outlet passageway leading from said mixing and reaction compartment adjacent said wall to said secondary mixing and reaction compartment, inlet means for liquid to be treated and reagent discharging into said mixing and reaction compartment, an elongated rotor mounted in said mixing and reaction compartment in position axially offset toward said passageway, said rotor having radial blades rotatable in the space underneath said passageway in close proximity to said floor and said wall and adapted, upon rotation, to pump liquid substantially in excess of the input quantity of liquid from said mixing and reaction compartment through said passageway and successively through the other two compartments, and also to set up within said mixing and reaction compartment a parallel equalized circulation of liquid over its entire length, an inlet passageway leading from said separation compartment into said mixing and reaction compartment remote from said outlet passageway, a treated liquid outlet from the upper part of said separation compartment, and a solids outlet from a lower portion of said chamber.

2. In a slurry type liquid treating apparatus comprising an elongated tank, elongated partition means including two opposed partition members slanting upwardly toward the longitudinal axis of said tank, said partition means extending for the full length of, and forming in, said tank two mixing and reaction compartments underneath said slanting members, two separating compartments overlying said slanting members, an upflow passageway from a portion of each mixing and reaction compartment adjacent the longitudinal axis of said tank leading upwardly to an elevation higher than the top of said slanting partition members, a downflow passageway from said elevation to each of said separating compartments, and an inlet channel into a lower portion of each mixing and reaction compartment remote from said longitudinal axis and communicating said lower portion with the overlying separating compartment, means for withdrawing treated liquid from an upper portion of each separating compartment, means for withdrawing solids from a lower portion of each separating compartment, a reel in each mixing and reaction compartment and extending for its length, each reel comprising a horizontally extending shaft and a plurality of blades supported from said shaft, each reel being axially offset with regard to its compartment toward said upflow passageway sufficiently that its blades extend into the space underneath said upflow passageway, means for rotating said reels upwardly underneath and adjacent said upflow passageway, each reel, upon its rotation, setting up in said mixing and reaction compartment a parallel equalized circulation of liquid over its entire length and simultaneously pumping liquid into and through said upflow passageway, said downflow passageway, said separating chamber and said inlet channel, back to said mixing and reaction chamber, and means for introducing liquid to be treated and reagent into said mixing and reaction chambers.

3. In a liquid treating apparatus of the type specified, an elongated mixing and reaction chamber having a floor and one wall at 90° to said floor, partition means including a slanting member forming a secondary reaction chamber above said mixing and reaction chamber and a separating chamber overlying a portion of the mixing and reaction chamber and separated therefrom by said slanting member, an outlet passageway leading from said mixing and reaction chamber to the secondary reaction chamber, said passageway being bounded on one side by said wall and on the other by said partition means, a rotor having radial blades extending lengthwise of the mixing and reaction chamber and positioned to rotate its blades underneath said outlet passageway in close tangential relation to said floor and said wall, said rotor pumping liquid upwardly along said wall and effecting a circulation of the liquid within said mixing and reaction chamber and ejection of liquid in excess of the quantity of throughput from said mixing and reaction chamber through said outlet passageway, through said secondary reaction chamber to said separating chamber, an elongated passageway between the lower edge of the slanting member of said partition and said floor for returning a portion of the liquid so circulated from said separating chamber to said mixing and reaction chamber, means for taking off treated liquid from the upper portion of said separating chamber, means for introducing liquid to be treated and reagent into said mixing and reaction chamber, means for withdrawing solids from a lower portion of said tank, and means for rotating said rotor blades upwardly adjacent said wall, thereby causing an upward flow underneath and adjacent said outlet passageway and a downward flow adjacent said elongated passageway.

4. A slurry type liquid treating apparatus comprising an elongated chamber having a bottom and vertically extending side walls, one of said side walls being at 90° to said bottom, means for withdrawing treated liquid from an upper portion of said chamber, said means establishing the normal liquid level in said chamber, means for withdrawing solids from a lower portion of said chamber, an elongated hood extending lengthwise of said chamber, a first passageway between said hood and said one side wall, a second passageway between said hood and the other side wall, a plate extending upwardly from the apex of said hood to an elevation below the normal liquid level in said chamber, a second plate spaced horizontally from said first plate and extending downwardly from an elevation above the normal liquid level in said chamber to an elevation spaced above said hood, a reel under said hood comprising a horizontally extending rotatable shaft and a plurality of radial blades supported from said shaft, said reel being mounted in axially offset position with respect to said hood toward said first passageway sufficiently that said blades extend into the space underneath said first passageway and rotate adjacent and tangential to said one side wall and to the floor of said chamber, and means for rotating said shaft in such direction that said blades move upwardly underneath and adjacent said first passageway, whereby liquid is pumped upwardly into and through said first passageway and over said first plate.

5. Apparatus of the type described comprising a tank having a substantially flat rectangular bottom, vertical end walls and side walls sloping at least in part outwardly and upwardly, a centrally located vertical wall dividing said tank into two laterally adjacent elongated chambers, each of said chambers having an overflow for clarified liquid, means for withdrawing solids from a lower portion of the chamber, a drain, partition means providing in the chamber a mixing and reaction compartment, a secondary reaction compartment having an upflow section and a downflow section, and a separating compartment, each of said compartments extending for the full length of said chamber, said mixing and reaction compartment communicating with the upflow section of said secondary reaction compartment through an outlet passageway formed by said vertical wall and a portion of said partition means, and communicating with said separating compartment through an inlet passageway formed by one of said sloping side walls and a portion of said partition means, said downflow section discharging to said separating compartment, means for introducing liquid to be treated and reagent into said mixing and reaction compartment, an elongated reel comprising a shaft extending the length of said mixing and reaction chamber, and blades supported from said shaft, said reel being mounted in said mixing and reaction compartment in axially offset position toward said outlet passageway, with its blades extending into the space underneath said outlet passageway, said blades being rotatable adjacent and tangentially to said bottom and upwardly adjacent said vertical wall and said outlet passageway, and means for rotating said reel.

6. The apparatus of claim 5 wherein said inlet means for liquid to be treated includes a centrally located elongated trough common to both laterally adjacent chambers, and a plurality of conduits leading from spaced points on both sides of said trough to the mixing and reaction compartments in said chambers.

7. Apparatus of the type described comprising an elongated tank, two laterally adjacent elongated chambers in said tank having a common side wall, means for withdrawing clarified liquid from said chambers, means for withdrawing solids from a lower portion of each chamber, a common inlet trough discharging to both chambers, elongated partition means forming a mixing and reaction compartment in the lower portion of each chamber, the lower edge of said partition means being spaced from the bottom of said tank to form inlet channels into said mixing and reaction compartments, a passageway leading from each mixing and reaction compartment upwardly along said common side wall to an elevation above said partition means and discharging from said elevation downwardly over said partition means, a reel in each mixing and reaction compartment, said reels extending for the length of said compartments and being axially offset with regard to said compartments toward said passageway, means for rotating said reels upwardly underneath said passageway and adjacent said common side wall whereby liquid is pumped upwardly into and through said passageway, and means for introducing reagent into said mixing and reaction compartments.

8. Apparatus of the type described comprising a tank having a substantially flat rectangular bottom, vertical end walls and side walls sloping at least in part outwardly and upwardly, a centrally located vertical wall dividing said tank into two laterally adjacent elongated chambers, each of said chambers having an overflow for clarified liquid, means for withdrawing solids from a lower portion of the chamber, a drain, partition means providing in the chamber a mixing and reaction compartment, a secondary reaction compartment having an upflow section and a downflow section, and a separating compartment, each of said compartments extending for the full length of said chamber, said partition means including two oppositely slanting plates forming a hood, a vertical plate extending from the apex of said hood and providing an elongated overflow at an elevation below the level of said overflow for clarified liquid, and a second vertical plate spaced laterally from said first plate and extending to an elevation above said overflow for clarified liquid, said mixing and reaction compartment communicating with the upflow section of said secondary reaction compartment through an outlet passageway formed by said vertical wall and a portion of said partition means, and communicating with said separating compartment through an inlet passageway formed by one of said sloping side walls and a portion of said partition means, said downflow section discharging to said separating compartment, means for introducing liquid to be treated and reagent into said mixing and reaction compartment, an elongated reel mounted in said mixing and reaction compartment in axially offset position, said reel having blades rotatable adjacent and tangentially to said bottom and upwardly adjacent said vertical wall and said outlet passageway, and means for rotating said reel.

9. Apparatus of the type described comprising a tank having a substantially flat rectangular bottom, vertical end walls and side walls sloping at least in part outwardly and upwardly, a centrally located vertical wall dividing said tank into two laterally adjacent elongated chambers, each of said chambers having an overflow for clarified liquid, means for withdrawing solids from a lower portion of the chamber, a drain, partition means including a hood providing in the chamber a mixing and reaction compartment, a secondary reaction compartment having an upflow section and a downflow section, and a separating compartment, each of said compartments extending for the full length of said chamber, said mixing and reaction compartment being located underneath said hood and communicating with the upflow section of said secondary reaction compartment through an outlet passageway formed by said vertical wall and a portion of said partition means, and communicating with said separating compartment through an inlet passageway formed by one of said sloping side walls and a portion of said partition means, said downflow section discharging to said separating compartment, an elongated reel mounted in said mixing and reaction compartment in axially offset position, said reel having blades rotatable adjacent and tangentially to said bottom and upwardly adjacent said vertical wall and said outlet passageway, means for rotating said reel, and means for introducing liquid to be treated and reagent into said mixing and reaction compartment, said inlet means for liquid to be treated including an elongated trough formed by a floor across the apex of said hood, said floor being spaced from one side of the hood to form therebetween a slot discharging in the direction of the flow set up by rotation of said reel.

10. Apparatus of the type described comprising a tank having a substantially flat rectangular bottom, vertical end walls and side walls sloping at least in part outwardly and upwardly, a centrally located vertical wall dividing said tank into two laterally adjacent elongated chambers, each of said chambers having an overflow for clarified liquid, means for withdrawing solids from a lower portion of the chamber, a drain, partition means providing in the chamber a mixing and reaction compartment, a secondary reaction compartment having an upflow section and a downflow section, and a separating compartment, each of said compartments extending for the full length of said chamber, said mixing and reaction compartment communicating with the upflow section of said secondary reaction compartment through an outlet passageway formed by said vertical wall and a portion of said partition means, and communicating with said separating compartment through an inlet passageway formed by one of said sloping side walls and a portion of said partition means, said downflow section discharging to said separating compartment, means for establishing a circulation within said mixing and reaction compartment and for pumping liquid from said mixing and reaction compartment through said secondary reaction compartment to said separating compartment, and means for introducing liquid to be treated and reagent into said mixing and reaction compartment, said means for introducing reagent including an elongated trough in the upper portion of said chamber, a pump having its intake in said upflow section, a conduit leading from the discharge side of said pump to said trough, a chemical inlet line discharging to said conduit, and a plurality of downtake pipes leading from spaced points along said trough to said mixing and reaction chamber.

References Cited in the file of this patent

UNITED STATES PATENTS

| | | |
|---|---|---|
| 2,245,587 | Hughes | June 17, 1941 |
| 2,264,139 | Montgomery et al. | Nov. 25, 1941 |
| 2,347,318 | Gurney | Apr. 25, 1944 |
| 2,348,122 | Green | May 2, 1944 |
| 2,348,123 | Green et al. | May 2, 1944 |
| 2,509,683 | Green | May 30, 1950 |
| 2,509,695 | Parker | May 30, 1950 |
| 2,526,478 | Hoffman et al. | Oct. 17, 1950 |
| 2,633,453 | McAllister | Mar. 31, 1953 |